United States Patent [19]
Feichtinger et al.

[11] 3,907,894
[45] Sept. 23, 1975

[54] PROCESS FOR THE PRODUCTION OF AZOMETHINE COMPOUNDS

[75] Inventors: Hans Feichtinger, Dinslaken; Werner Kluy, Bochum-Stiepel; Jurgen Falbe, Dinslaken, all of Germany

[73] Assignee: Ruhrchemie Aktiengesellschaft, Oberhausen, Germany

[22] Filed: Nov. 24, 1972

[21] Appl. No.: 309,285

[30] Foreign Application Priority Data
Dec. 1, 1971  Germany............................ 2159529

[52] U.S. Cl........................... 260/566 R; 260/347.7
[51] Int. Cl.²....................................... C07C 119/00
[58] Field of Search................................. 260/566 R

[56] References Cited
UNITED STATES PATENTS
2,421,937  6/1947  Haury .............................. 260/566 R
2,422,013  6/1947  Haury et al. .................... 260/566 R

*Primary Examiner*—Gerald A. Schwartz
*Attorney, Agent, or Firm*—Bierman & Bierman

[57] ABSTRACT

Azomethine compounds are produced by reacting condensation products, obtained in known manner from saturated aliphatic, cycloaliphatic, aromatic and heterocyclic aldehydes and ammonia, with hydrogen in the presence of catalysts, containing at least one metal of group VIII B of the periodic table of elements, at a temperature of 20° to 200° C. and at atmospheric pressure. Preferably, the catalysts also contain at least one metal of group VI B of the periodic table of elements.

13 Claims, 1 Drawing Figure

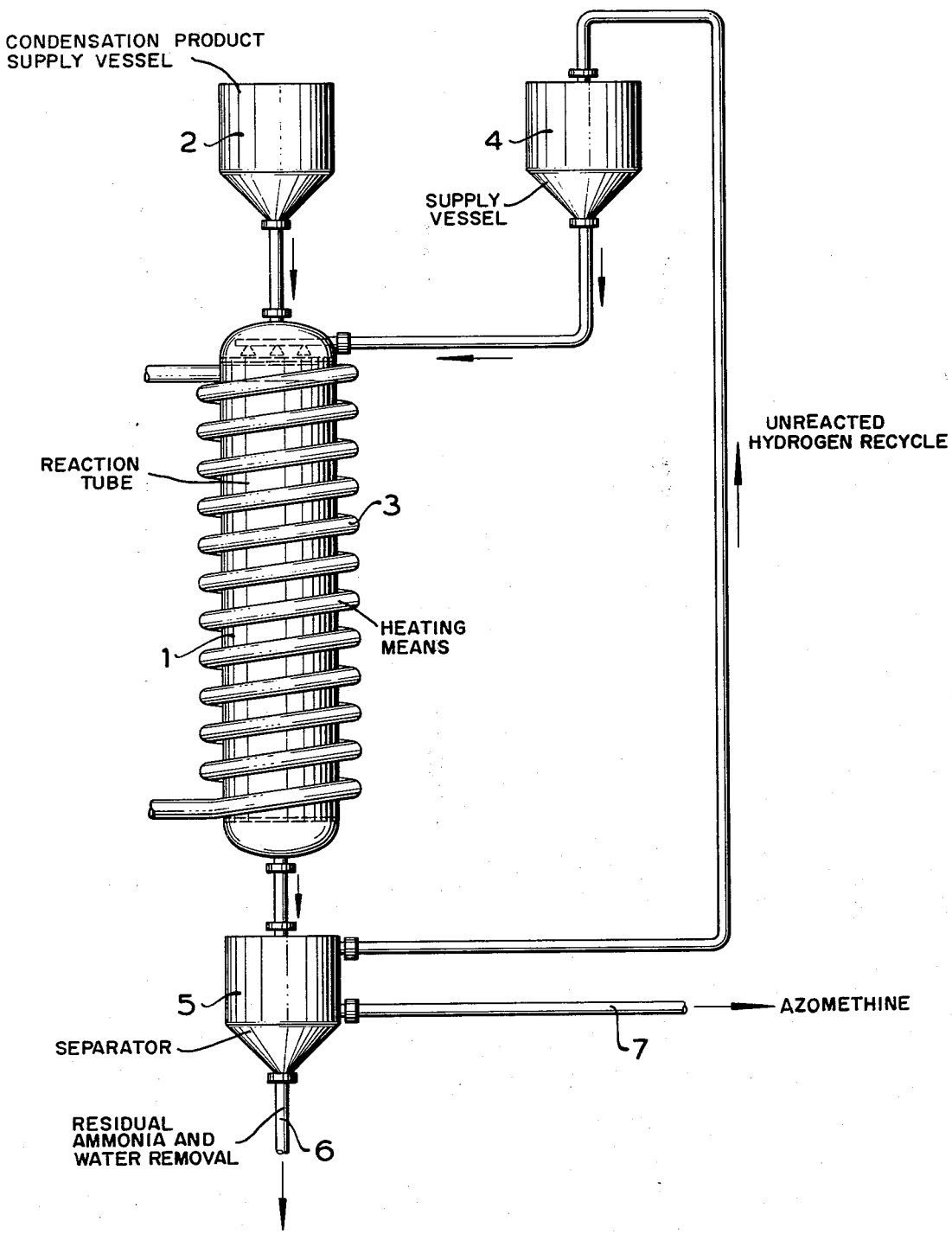

PROCESS FOR THE PRODUCTION OF AZOMETHINE COMPOUNDS

The process of producing azomethines from primary amines and aldehydes by dehydration is known. It can be performed with aldehydes and amines, which may be of the aliphatic, cycloaliphatic, aromatic and heterocyclic type (Houben-Weyl, Vol. VII/1, page 454, Vol. XI/2, page 73 ff and British Pat. No. 1,173,982). Azomethine compounds represent valuable intermediate products for further syntheses. For instance, alkylidenealkylamines can readily be converted to secondary amines by treatment with hydrogen under pressure (Houben-Weyl, Vol. XI/1, page 602). Azomethine compounds (Schiff's bases) can also be prepared by reaction of aldimines or ketimines with primary amines with ammonia or amine being, respectively, split off. Reactive carbonyl compounds are frequently condensed, preferably in the form of their corresponding acetals, with amines to Schiff's bases (Houben-Weyl, Vol. XI/2, page 78).

It is an object of the present invention to provide a method of producing azomethines from aldehydes and ammonia at atmospheric pressure.

This is accomplished by reacting condensation products, obtained in known manner from saturated aliphatic, cycloaliphatic, aromatic and heterocyclic aldehydes and ammonia with hydrogen in the presence of catalysts containing at least one metal of group VIII B of the periodic table of elements at a temperature of 20° to 200° C. and at atmospheric pressure.

Preferably, the catalysts contain also at least one metal of group VI B of the periodic table of elements, especially chromium.

Catalysts containing at least one metal of the group consisting of iron, cobalt and nickel, preferably nickel, together with at least one compound of a metal of group VI B of the periodic table, preferably Chromium(3)-oxide, are advantageous.

Especially well suited are nickel containing carrier-catalysts, to which activators, such as, for instance, magnesium oxide or aluminum oxide, have been added. Examples of preferred catalyst compositions are as follows:

1. 56-57 % by weight nickel, magnesium oxide and carrier material
2. about 25 % by weight nickel, aluminum oxide and carrier material
3. about 50 % by weight nickel, chromium(3)-oxide and carrier material
4. about 52-53 % by weight nickel, chromium(3)-oxide and carrier material Condensation products obtained in known manner by reaction of aldehyde and ammonia differ in composition. For instance the reaction of isobutyraldehyde and ammonia, affords a condensation product having a bis-(iso-butylidene amino)-2-methylpropane structure (Hasek, Elam, Martin, Journal of Organic Chemistry, Vol. 26, page 1822, 1961). Other aliphatic aldehydes yield nitrogen containing condensation products, which additionally contain oxygen, obviously in hydroxyl-form. Aromatic or heterocyclic aldehydes yield hydramides by reaction with ammonia.

The reaction according to the invention can be performed in a conventional vessel, equipped with a stirrer, by passing hydrogen through an aldehyde/ammonia condensate containing suspended catalyst. The process may also be conducted in a continuous manner.

Although the reaction can be performed even at ambient temperature, the use of temperatures in the range of 80° to 140° C. decreases reaction time. If hydroxyl-containing hydramides are converted the resulting reaction water is discharged with excess hydrogen. After a reaction time of one to several hours, the reaction product is separated from the catalyst by filtration or centrifuging and, if necessary, distilled under vacuum.

The process of the invention is especially well suited for the conversion of condensation products of ammonia and aldehydes obtained by hydroformylation of olefins.

Condensation products of ammonia and aldehydes having about 3 to 20 carbon atoms are preferred.

Condensation products of propionaldehyde, n- and isobutyraldehyde, isovaleraldehyde and isononylaldehyde lead to the corresponding azomethines n-propylidene-n-propylamine, n-butylidene-n-butylamine, isobutylidene-isobutylamine, isoamylidene-isoamylamine, isononylidene-isononyl-amine in practically quantitative yield.

Condensation products of ammonia and cycloaliphatic, aromatic and heterocyclic aldehydes such as formylcyclohexane, benzaldehyde, toluylaldehyde, xylxyl-aldehyde, furfurol and aldehydes derived from pyranes may be converted in an analogous manner. Condensation products of aliphatic aldehydes which are substituted by phenyl-, cycloalkyl- or tetrahydrofuryl groups are particularly well suited.

Independent of their state of aggregation, the aldehyde/ammonia condensation products can be converted to the corresponding azomethines according to the invention. The conversion, especially of solid or strongly pasty condensation products, may be effected in the presence of inert, aprotic solvents, as for instance benzol, cyclohexane, toluol, xylol and aliphatic hydrocarbons.

A preferred embodiment of the process according to the invention is carried out in the device shown in the attached drawing. In this embodiment, a vertically arranged, heated reaction tube 1 of glass, quartz or steel is continuously charged from supply vessel 2 with a condensation product prepared by reaction of aldehyde and gaseous ammonia and freed from reaction water. The reaction tube contains a catalyst in the form of tablets arranged in a fixed bed. The reaction vessel 1 is heated with the aid of an electrical or circulating heating device 3.

Hydrogen from supply vessel 4 is continuously introduced into reaction tube 1. The starting materials, viz. aldehyde-ammonia-condensation product and hydrogen, are converted in a molar ratio between 1:1 and 1:3, preferably in a molar ratio of 1:2. Unreacted hydrogen is recirculated to supply vessel 4.

The resulting azomethine is drawn off at the bottom of reaction tube 1. Ammonia formed during the reaction as well as reaction water originating from hydroxy-groups of the raw aldehyde-ammonia-condensation product are condensed or separated respectively in separator 5 and drawn off at 6. Azomethine freed of water is drawn off at 7.

The following examples illustrate the invention.

EXAMPLE 1

In a 2 l three-necked flask, equipped with an inlet tube, a stirrer and a reflux cooler, cooled to −15° C. with the aid of a freezing mixture, 1000 g $NH_3$-free condensation product of isobutyraldehyde and ammonia (bis-[isobutylidenamino]-2-methylpropane) and 80 g of a commercially available nickel containing carrier catalyst, comprising about 52 to 53% by weight nickel and chromium(3)-oxide as activator were treated with hydrogen at a temperature of 80° C. 60 l hydrogen were introduced per hour. Altogether, 240 l hydrogen were introduced during a reaction time of 4 hours. After the reaction the catalyst was separated by filtration and the reaction product distilled at atmospheric pressure. 936 g of organic product were obtained. It was determined by IR-spectroscopy to be isobutylidene-isobutylamine. The yield was 96.2% of theoretical. The base had the following characteristics:

| boiling point [°C] | | 130–132 |
|---|---|---|
| nitrogen content (% by weight) | calculated | 10.8 |
| | determined | 10.3 |

The distillation product was hydrogenated at 120° under a pressure of 120 atm. Di-isobutyl-amine was obtained in a yield of 92% of theoretical.

EXAMPLE 2

In a 2 l three-necked flask, equipped with an inlet tube, a stirrer and a reflux cooler with a cooling device as described in Example 1, 1290 g $NH_3$-free condensation product of n-butylraldehyde and ammonia and 120 g of a commercially available nickel containing carrier catalyst comprising about 52 to 53% by weight nickel and chromium(3)-oxide as activator were treated with hydrogen at a temperature of 110° C. The gas-velocity amounted to 60 l hydrogen per hour. Altogether, 240 l hydrogen were introduced during a reaction time of 4 hours. After the reaction, the catalyst was separated from the reaction product by filtration. The reaction product contained 98 g water. The organic phase was distilled at atmospheric pressure. IR-spectroscopic analysis revealed that 720 g n-butylidene-n-butylamine, corresponding to a yield of 60% of theoretical were produced. The base had the following characteristics:

| boiling point [°C] | | 140–144 |
|---|---|---|
| nitrogen content (% by weight) | calculated | 10.8 |
| | determined | 10.04 |

By hydrogenation of the distillation product at 120° C. and 150 atm, dibutylamine was obtained in a yield of 94% of theoretical.

In the following examples, distillation of the reaction products was omitted. The presence of the corresponding azomethine compounds was ascertained by IR-spectra and nitrogen analysis, the yields were determined by hydrogenation to the corresponding secondary amines at 120° C. and 120 atm in the presence of a commercially available nickel catalyst.

EXAMPLE 3

600 g $NH_3$-free condensation product of 3-methylbutanal and ammonia, dissolved in 600 g isooctane and 80 g of a commercially available nickel-carrier-catalyst comprising about 52 to 53% by weight nickel and chromium(3)-oxide as activator were treated with hydrogen at a temperature of 60° C. in a 2 l three-necked-flask in the manner described in Example 1. The gas-velocity amounted to 80 l per hour. Altogether, 240 l hydrogen were introduced during a reaction time of 3 hours. After termination of the reaction, the catalyst was separated by filtration and isooctane was distilled off at atmospheric pressure. 587 g 3-methylbutylidene-3-methyl-butylamine were obtained as product. Its nitrogen analysis was 7.9% N as compared to the calculated theoretical value of 8.9% N. Hydrogenation of the product at 120° C. and 120 atm yielded 405 g di-(3-methylbutyl)-amine, or 71% of theoretical, based on the reaction product.

EXAMPLE 4

As described in Examples 1 and 2, 1000 g condensation product of 2-ethylhexanal and ammonia were treated with hydrogen at 90° C. in the presence of 100 g of a commercially available nickel-carrier-catalyst comprising about 52 to 53% by weight nickel and chromium(3)-oxide as activator in a 2 l three-necked flask. The gas-velocity of the hydrogen amounted to 80 l per hour. Altogether, 240 l hydrogen were introduced during a reaction time of 3 hours. After termination of the reaction, a sample of 20 g of the product was freed of catalyst and subjected to nitrogen analysis. The remaining 2-ethylhexylidene-2-ethylhexylamine still containing the bulk of the nickel catalyst, was hydrogenated at 120°C. and 120 atm 910 g di-(2-ethylhexyl)-amine were obtained, corresponding to a yield of 91% of theoretical. Nitrogen analysis of the 2-ethylhexylidene-2-ethylhexylamine showed a content of 5.2% N as compared to the calculated theoretical value of 5.8% N.

EXAMPLE 5

As described in Examples 1 and 2, 1000 g isononyl-aldehyde-ammonia-condensation product were treated with hydrogen in a 2 l three-necked-flask at a temperature of 90° C. in the presence of 100 g of a commercially available nickel-carrier-catalyst containing about 52 to 53% by weight nickel and chromium(3)-oxide as activator. The gas velocity amounted to 100 l per hour. Altogether, 200 l hydrogen were introduced during a reaction time of 2 hours. After termination of the reaction, the catalyst was separated by filtration. 985 g isononylidene-isononyl-amine were obtained. It contained 4.85 g N (as determined by nitrogen analysis); calculated theoretical amount being 5.15 g N. Hydrogenation of the said base at 130° C. and 120 atm yielded 727 g di-(isononyl)-amine, corresponding to a yield of 74% azomethine compound, based on theoretical.

EXAMPLE 6

1000 g benzaldehyde were reacted with gaseous ammonia to benzhydramide. The reaction product was freed from reaction water and introduced into a 2 l three-necked-flask as described in Examples 1 and 2. It was reacted with hydrogen at a temperature of 100° C. in the presence of 100 g of a commercially available nickel-carrier-catalyst containing 52 to 53% by weight nickel and chromium(3)-oxide as activator. The gas velocity amounted to 80 l per hour. 320 l hydrogen were introduced during a reaction time of 4 hours. Thereafter, the organic reaction product (benzylidenebenzylamine) containing the catalyst was hydrogenated at 150° C. and 120 atm gauge. 771 g of dibenzylamine were obtained, corresponding to a yield of 82% of the azomethine compound based on theoretical. The nitrogen content of the benzylidene-benzylamine was determined as 5.95% N as compared to the calculated theoretical value of 7.18% N.

EXAMPLE 7

500 g 2-phenylpropanoal were reacted with gaseous ammonia. The crystalline condensation product was suspended in toluol and treated with hydrogen at a temperature of 110° C. in the presence of 80 g of a commercially available nickel-carrier-catalyst containing about 52 to 53% by weight nickel and chromium(3)-oxide as activator, as described in the foregoing examples. The velocity of the hydrogen amounted to 100 l per hour. Altogether 300 l hydrogen were introduced during a reaction time of 3 hours. The yield of 2-phenyl-propylidene-2-phenylpropylamine amounted to 395 g, corresponding to the amount of secondary amine obtained by hydrogenation of the azomethine compound at 120° C. and 120 atm gauge, viz. 84% of theoretical. The nitrogen content of the 2-phenylpropylidene-2-phenylpropylamine was determined as 4.86% N as compared to the calculated theoretical value of 5.54% N.

EXAMPLE 8

1000 g furfurol were condensed with gaseous ammonia to furfurhydramide. The resulting reaction product was freed of water and treated with hydrogen at a temperature of 130° C. in the presence of 100 g of a commercially available nickel-carrier-catalyst containing about 52 to 53% by weight nickel and chromium(3)-oxide as activator. 320 l hydrogen were introduced at a gas velocity of 80 per hour, and over a reaction time of 4 hours. The yield of furfurylidene-furfurylamine amounted to 750 g, corresponding to the amount of difurfurylamine obtained by hydrogenation of the reaction product according to the invention at 130° C. and 130 atm gauge, which is 87% of theoretical. The nitrogen content of furfurylidene-furfurylamine was determined as 6.85% N as compared to the calculated theoretical value of 7.91% N.

EXAMPLE 9

A glass tube having a length of 1000 mm and an interior diameter of 28 mm is filled with granulated nickel-carrier-catalyst containing about 52 to 53% by weight nickel and chromium(3)-oxide as activator. 300 g of the condensation product of isobutyraldehyde and ammonia and 90 l hydrogen, were respectively passed per hour through the catalyst at 140° C. After conversion of 900 g of condensation product 820 g isobutylidene-isobutylamine, corresponding to 98.2% of theoretical were obtained. The characteristics of the base are:

| boiling point (°C.) | | 130–132 |
|---|---|---|
| nitrogen content (% by weight) | calculated | 10.8 |
| | determined | 10.4 |

The azomethine compound derived from isobutyraldehyde could be hydrogenated almost quantitatively to diisobutylamine at 120° C. and 120 atm gauge as pointed out in Example 1.

EXAMPLE 10

300 g of the condensation product of n-butyraldehyde and ammonia and 60 l hydrogen, were respectively passed per hour at 130° C. through the catalyst as described in Example 9. Altogether 1000 g aldehyde-ammonia-condensation product were converted. The resulting organic phase of the reaction product contained 720 g n-butylidene-n-butylamine, as could be shown by hydrogenation of the product to secondary butylamine at 120° C. and 150 atm gauge. Thus, the yield amounted to 84.2% of theoretical.

EXAMPLE 11

1250 g isononylaldehyde-ammonia-condensation product and 50 l hydrogen, were respectively passed per hour through the reaction tube provided with catalyst as described in Example 9. The total conversion of isononylaldimine amounted to 1000 g. 940 g isononylidene-isononylamine were obtained. 4.78% N was determined by nitrogen analysis, as compared to the calculated theoretical value of 5.15% N. The base was hydrogenated to 747 g diisononylamine at 120° C. and 130 atm gauge. Thus, the yield of isononylidene-isononylamine is calculated as 77.8%.

What is claimed is:

1. A process for the production of azomethine which comprises reacting a condensation product of a saturated aliphatic, saturated cycloaliphatic, or aromatic aldehyde and ammonia with hydrogen in the presence of a group VIII B metal containing catalyst at a temperature of 20° – 200°C. and at atmospheric pressure.

2. The process according to claim 1 wherein the reaction is carried out in the presence of a group VIII B metal containing catalyst which additionally contains a group VI B metal.

3. The process according to claim 1 wherein the catalyst contains at least one metal selected from the group consisting of iron, cobalt and nickel.

4. The process according to claim 2 wherein the catalyst contains at least one metal selected from the group consisting of iron, cobalt and nickel.

5. The process according to claim 3 wherein said catalyst contains nickel.

6. The process according to claim 4 wherein said catalyst contains nickel.

7. The process according to claim 2 wherein the catalyst contains chromium.

8. The process according to claim 7 wherein the catalyst contains chromium(3)-oxide.

9. The process according to claim 1 wherein the reaction is carried out at a temperature of from 80°C. to 140°C.

10. The process according to claim 1 wherein said condensation product is a condensation product of an aldehyde produced by hydroformylation of an olefin.

11. The process according to claim 1 wherein the aldehyde has 3 to 20 carbon atoms.

12. The process according to claim 1 wherein conversion of the condensation product is effected in the presence of an inert aprotic solvent.

13. The process according to claim 12 wherein the solvent is selected from the group consisting of benzol, cyclohexane, toluol, xylol, and aliphatic hydrocarbons.

* * * * *